United States Patent [11] 3,566,042

[72] Inventor Giorgio Pugliese
15, via Luigi Gall, Rome, Italy
[21] Appl. No. 636,193
[22] Filed May 4, 1967
[45] Patented Feb. 23, 1971

[54] DEVICE FOR PREVENTING OR SIGNALLING THE DIALING OF GIVEN TELEPHONE NUMBERS
14 Claims, 7 Drawing Figs.

[52] U.S. Cl. 179/27
[51] Int. Cl. H04q 3/10
[50] Field of Search 179/18.2, 27.021, 18.3, 90 (R) (Cursory)

[56] References Cited
UNITED STATES PATENTS

| | | | |
|---|---|---|---|
| 1,380,039 | 5/1921 | Chapin | 179/18 |
| 2,375,514 | 5/1945 | Bakker | 179/18 |
| 2,813,930 | 11/1957 | Berch | 179/27 |
| 1,341,801 | 6/1920 | Heimann | 179/90 |

OTHER REFERENCES

J. Atkinson, Telephony, Vol. II, 1950, pp. 8 TK6161 H57 1948— Copy Available in Patent Office

*Primary Examiner*—Kathleen H. Claffey
*Assistant Examiner*—David L. Stewart
*Attorneys*—Gordon W. Hueschen and Hueschen and Kurlandsky

ABSTRACT: The invention refers to a device which prevents the telephones it controls from calling telephone numbers commencing with given digits, such as the digits of an area code, toll call office, etc.

PATENTED FEB 23 1971 3,566,042

INVENTOR.
GIORGIO PUGLIESE
BY [signature]
ATTORNEY

INVENTOR.
GIORGIO PUGLIESE
BY
[signature]

DEVICE FOR PREVENTING OR SIGNALLING THE DIALING OF GIVEN TELEPHONE NUMBERS

FIELD OF THE INVENTION

The present invention relates to the field of so-called disablers, that is to devices applicable to automatic telephone sets to prevent the calling of any number beginning with given first digits, e.g. with the first digits of area codes or toll central offices. Devices of this kind can be installed in single telephone sets or in private branch exchanges.

KNOWN ART

Disabling devices of various types, applicable to public or private branch exchanges are known per se. However, all these known devices present the disadvantage that they must be installed into telephone exchanges, that they are not applicable to all existing exchange systems and mainly that, once they are installed, they cannot be temporarily disconnected to permit the subscriber himself or persons authorized by him to make trunk calls. There exist other known disabling devices which are mounted upon the dial of the telephone set. This type of disabler presents, however, the disadvantage that its application requires a substantial modification of the internal circuitry of the set. Its use is anyhow restricted to a single set and it cannot be disconnected at will by the subscriber. There exist also disablers which, by connecting the line elements which detect the electric signals emitted during the various steps connected with the calling of a telephone number, discriminate the latter and could therefore be adapted for the disabling function required; however, disablers of this latter type need their own individual power source and are therefore impractical. This need renders them ineffective in case of current interruptions, so that their safe operation would require the installation of auxiliary storage batteries.

This brief survey of the known art shows clearly that the disabling systems so far used are not adapted to solve the problem of realizing a device which can be applied to a single telephone set or to a telephone line or to a private branch exchange serving a number of telephone sets and which can be switched in and out by the subscriber, at will, if he himself wants to make a trunk call or wants to prevent such trunk calls to be made by unauthorized persons during his absence.

A disabling device according to the present invention can be installed, as already stated, at any point of an automatic telephone line, and it uses for its operation no extra power source but only the telephone line potentials and part of the current operating the telephone set. It can be switched on and off at will and if switched on, it blocks the transmission of the dial pulses from the telephone set to the exchange any time numbers are called, which begin with given first digits, without preventing the telephone sets involved from receiving all types of incoming calls. Particular embodiments of the device permit, when installed on a line serving various telephone sets, to disable only part of said sets.

The disabling device of the invention, which can be inserted as a quadripole into a subscriber loop or an extension, comprises a spring-biased pulse counting means, which presents cam discs as well as a ratchet wheel, which are rigidly mounted on a rotatable shaft; a step by step relay having a holding coil which rotates by means of its armature the pulse counting means proportionally to the dial pulses; a ratchet enabling relay having a holding coil and engaging, with its pawl, the pulse counting means throughout the pulse trains; a contact, actuated by one of said cam discs which, when the first dial pulse train corresponds to an excluding digit, inserts a pulse damping means parallel to the telephone station and thereby weakens the successive dial pulse trains to a level below the response of the exchange selector. An additional contact, actuated by the dropping of the armature of the ratchet enabling relay when the first dial pulse train does not correspond to an excluding digit, closes the circuit of the step by step relay and keeps its armature attracted, thereby blocking the pulse counting means in the position assumed at the end of said permissible dial pulse train, thereby letting all successive dial pulse trains of the dialed number pass even if they correspond to an excluding digit.

These and other objects and advantages of the present invention will result clearly from the following detailed description of some of its embodiments, made with reference to the attached drawings, it being understood all these embodiments are here illustrated for a purely exemplicative and in no way limitative purpose.

IN THE DRAWINGS

Figure 1:
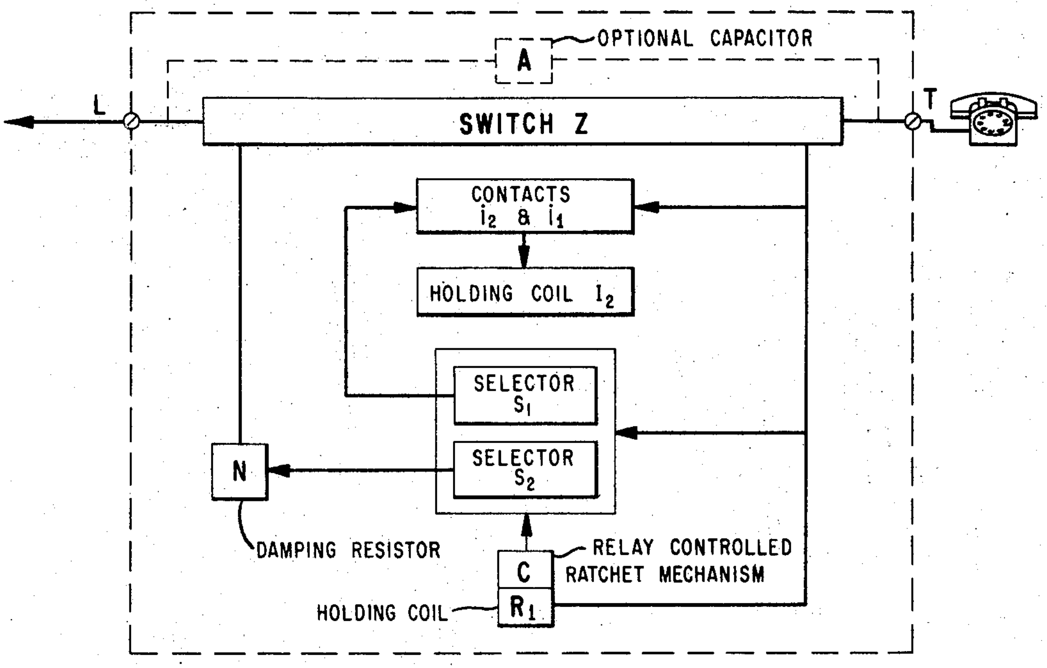
FIG. 1 is a general block diagram of the disabler according to the invention.
Figure 2:
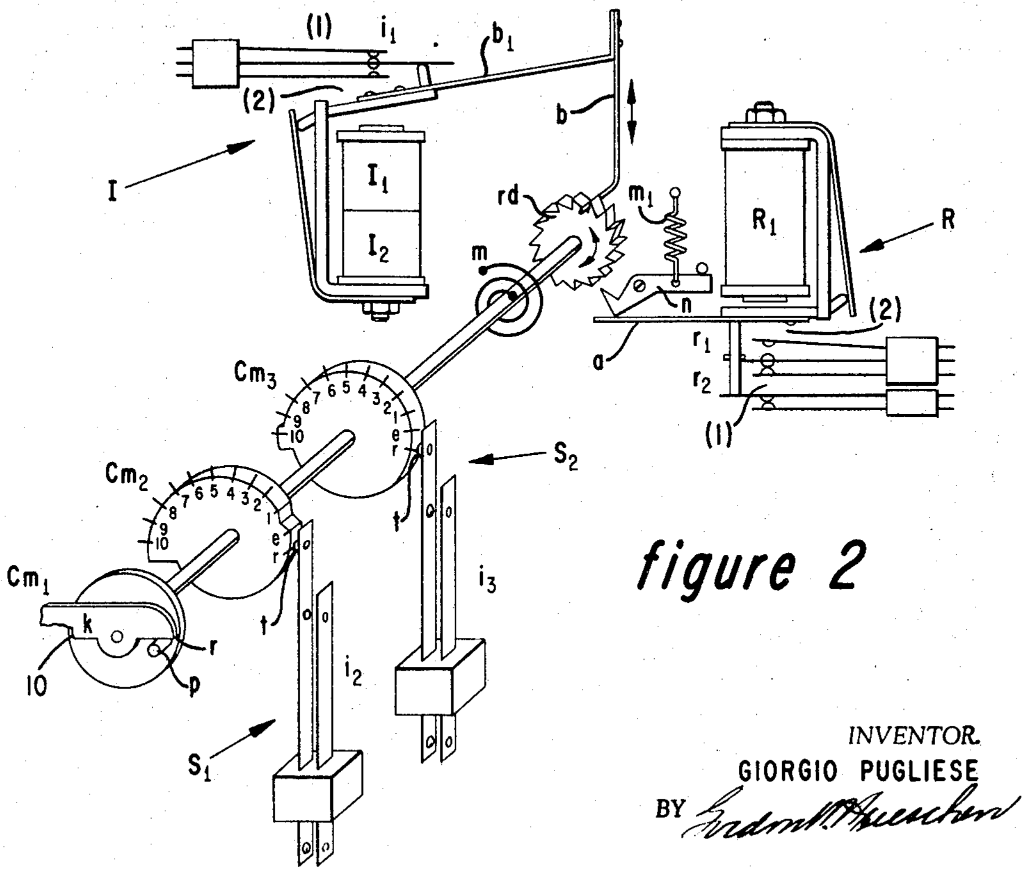
FIG. 2 represents schematically the electromechanical organs common to all embodiments.

With reference to FIGS. 1 and 2, the disabling device is connected through switch Z on one hand through the line T with the telephone station, and on the other hand through the line L with the selector plant of the telephone exchange. It comprises a ratchet enabling relay R, including ratchet mechanism C, which actuates pawl *n* and holding coil $R_1$, keeping this relay attracted also during dial pulse train intervals, a step by step relay I with coil $I_1$, a contact $i_1$ controlled by this relay, and a pulse counting means, which will be described later, including cam disc-type selectors $S_1$ and $S_2$ having cam discs $Cm_2$ and $Cm_3$, respectively.

The block diagram of FIG. 1 additionally comprises time delay means comprising contact $i_1$ controlled by step by step relay I and contact $i_2$ controlled by selector $S_1$ at the first dial pulse and activated at each dial pulse in order to render, operating, at the completion of the dialing of the first digit, the temporary holding means $I_2$ which is a holding coil of step by step relay I and a damping resistor N to damp the dial pulses.

Resistor N is inserted into the telephone line parallel to the telephone set by contact $i_3$ actuated by cam disc $Cm_3$ of selector $S_2$ when a number beginning with an excluding digit is called from said telephone station. If necessary, the excluding device can be completed with means A, for instance a capacitor, to prevent the damping of voice frequencies.

To prevent the device from producing computing errors, some special applications thereof require in addition to the above described means: input control means placed on the line to the telephone exchange, to render inoperative the digit discriminator means for current interruptions occurring in the telephone line (for durations shorter or slightly longer than those of the dial pulses) which occur in the time between the lifting of the handset and the dialing of the first digit; and/or a device to control the magnitude of the telephone line feed voltage, said device being inserted into said line to permit the operation of the disabling device only when said feed voltage reaches or exceeds a preset magnitude. Said means controlling the magnitude of the feed voltage may be replaced, in some cases, by a dial tone detector inserted in the line, which permits the actuation of the device only after the detection of said signal.

The responsiveness of the disabling device can be increased by the addition of suitable sensitizing means connected with the telephone line so as to permit the utilization of the current present in it, both during the closing and the opening phase produced by the telephone set.

As previously mentioned, the application of said device to telephone sets permits them to receive all incoming local and trunk calls.

The arrangement and operation of the electromechanical organs will now be described on the basis of their interconnection according to FIG. 2.

The armature *a* of relay R lifts against the bias of a spring $m_1$ during the dialing operation, a pawl *n* into engagement with a ratchet wheel *rd*, to prevent its counterclockwise rotation. Armature $a$ also controls a switch $r_1$ and a switch $r_2$. The holding winding $R_1$ prevents the release of armature $a$ and thus the return of ratchet wheel $rd$ during the intervals between successive dial pulses.

As stated, the step by step relay I has, in addition to its normal winding $I_1$ a holding winding $I_2$. Its armature $b_1$ is connected to an arm $b$ engaging the ratchet wheel $rd$ to rotate it clockwise each time a dial pulse causes the attraction of the armature. Said armature also controls the opening and closing of a switch $i_1$ as will be described later.

Ratchet wheel $rd$ is fastened to a shaft $w$ which is biased for a counterclockwise rotation by a spiral spring $m$. To said shaft are also keyed or otherwise secured: a selector $S_1$, consisting in this case of a cam disc $Cm_2$ and a contact $i_2$ controlled by it; a selector $S_2$ consisting of a cam $Cm_3$ and a contact $i_3$ controlled by it; and a wheel $Cm_1$ fitted with a peg $p$ projecting from it, which wheel coacts with a stationary limit stop K to delimit the rotation of said shaft $w$ between two end positions. The assembly comprising cams $Cm_1$, $Cm_2$ and $Cm_3$ operates in the following 12 positions, referred to pins $t$ on contacts $i_2$ and $i_3$: rest position $r$ corresponding to the cradled position of the handset; initial working position $e$ corresponding to the lifting of the handset; positions 1 through 10 determined by the number of dial pulses acting on I and thus by the first digit dialed. Through pins $t$ cams $Cm_2$ and $Cm_3$ act upon the contacts $i_2$ and $i_3$, respectively, in the following manner: contact $i_2$ remains open when the cam discs are in the position $r$ or $e$ and is closed when they are rotated to any of the positions 1 through 10; contact $i_3$ remains open for any cam disc position comprised between $r$ and 9, and is closed correspondingly to position 10.

Figures 3, 4:
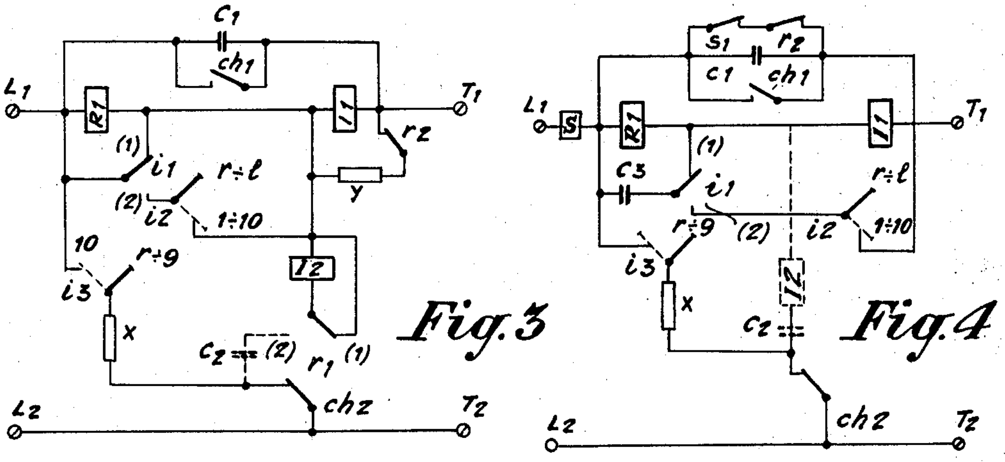
FIGS. 3 through 7 represent, in a rest position, some of the possible circuits realizing the block diagram of FIG. 1.

As shown in FIG. 3, the disabling device is connected by its two terminals $T_1$ and $T_2$ to the telephone set and by its other two terminals $L_1$ and $L_2$ to the line leading to the exchange. The device can be connected or disconnected manually from the telephone by switching the double connector $ch_1$ and $ch_2$ on or off, respectively.

The operation of the embodiment of FIG. 3 is the following: the lifting of the handset from its hook or cradle closes, as known, the line circuit and thereby energizes, through coil $I_1$, the relay I: the corresponding attraction from its armature will cause arm $b$ to turn wheel $rd$ one tooth and rotate cams $Cm_2$ and $Cm_3$ from position $r$ to position $e$. Switch $i_1$ of relay I is shifted by the attraction of armature $b_1$ into position 2, while contacts $i_2$ and $i_3$ remain open. The closure of the line circuit also energizes relay $R_1$, its armature $a$ lifts pawl $n$ into engagement with ratchet $rd$ where it is kept owing to the holding action of winding $R_1$ thereby preventing the wheel from being rotated counterclockwise by spring $m$ in the intervals between dial pulses when arm $b$ reverts to its lifted position.

By the lifting of armature $a$ switch $r_1$ is shifted from position 1 to position 2, thereby connecting the holding winding $I_2$ of relay I in series with a capacitor $C_2$ and eliminating its holding action. As known, the dialing of each digit sets up rhythmic interruptions of the line current. The dialing of each digit, including the first, of the telephone number called produces therefore a train of dial pulses equal to the units composing said digit. Since coil $I_2$, with $r_1$ in position 2, is inactive and thus relay I is energized at each pulse, $b$ will rotate wheel $rd$ and thereby the whole selector assembly one step at each pulse. At each pulse interval switch $i_1$ is restored by armature $b_1$ to its position (1), to short-circuit holding winding $R_1$ and render it operating. Thereby R remains energized at each pulse interval, for a time equaling or slightly exceeding said interval. As a consequence thereof, pawl $n$ remains constantly engaged with the teeth of wheel $rd$ and prevents its return to its initial position under the action of spring $m$ when arm $b$ is lifted. At each pulse, $i_1$ reverts to position 2.

The first pulse train brings cam $Cm_2$ into any of the positions 1—10 and thus causes the closing of contact $i_2$. This closed position is indicated by a dotted line in FIG. 3. The closed contact $i_2$, with $i_1$ in position 2, short circuits again R and its holding winding $R_1$ and causes thereby the deenergization of R with a time delay equal or slightly longer than the dial pulse at the end of each first pulse train, i.e. when the short circuit of $R_1$ produced by the contacts $i_1$ and $i_2$ has been realized.

Therefore, during the pulses set up by dialling the first digit, relay R remains in the operating position, since its winding is always short-circuited and therefore the required step rotation of wheel $rd$ can be effected, while at the end of the relating pulse train, as soon as the time delay obtained by winding $R_1$ has lapsed, R becomes deenergized and switch $r_1$ changes into position (1) thereby short-circuiting the holding winding $I_2$ and disconnecting it from capacitor $C_2$. The short-circuiting of winding $I_2$ causes a temporary delay in its deenergization, which delay is longer than the duration of each single dial pulse. Thereby relay I is constantly kept energized, with arm $b$ being kept engaged with wheel $rd$ and thus it is rendered irresponsive to the pulses of the digit next dialed, even if this digit is the excluding digit 0. The selector assembly remains thereby blocked in the position reached at the end of this first pulse train, until the handset is replaced. In this manner, the pulses emitted from the telephone set by the dialing of the successive digits forming the telephone number called, can all pass through the device without attenuation and reach the exchange. The fact that the device remains in its blocked position until the circuit is reopened by cradling the handset, has the purpose of avoiding that the dialing of the successive digits may lead to an accumulation of the successive digits with those already counted by the selector assembly, until it reaches the disabling position 0 of $Cm_3$.

The replacement of the handset interrupts the line current for a time longer than the temporary holding time of I, causes the deenergization of this relay and thus the release of wheel $rd$ by arm $b$, thus permitting spring $m$ to restore the selector assembly to its initial inoperating position by rotating it counterclockwise until it reaches, with pin $p$ of cam disc $Cm_1$, stop K in the rest position $r$.

If the first digit dialed is the disabling digit 0 (10in the figures) cam $Cm_3$ will attain position 10 and close contact $i_3$ by shifting it to the position 10 of FIG. 3 rendering thereby ineffective the reception of the successively dialed digit by the automatic exchange, this effect being obtained by inserting across the telephone line, on the side of the terminals $L_1$ and $L_2$, a resistor $x$ of such a magnitude as to neutralize the rhythmic pulse train in the line current set up by the dial, which resistor already permanently closes the line. Said resistor can be replaced by a suitably dimensioned capacitor. It is obvious that the closure of contact $i_3$ can also be used to actuate any kind of signaling device.

The disabler of the invention is also equipped with a double feed control in the telephone line in order to prevent the disabler from indicating wrong pulse counts when, in the time intervening between the lifting of the handset and the first dialing, there occur interruptions of a length not smaller or only slightly higher than the dial pulses in the line leading to the telephone exchange. In the present embodiment the feed control is twofold in the sense that, in the absence of current in the telephone line (interruptions on the side of the exchange) it not only cancels the temporary holding action of relay R, but also cancels a temporary holding action of the discriminator. In the presence of feed current in the telephone line, the temporary holding action of relay R is assisted, during the line interruptions on the side of the telephone set, i.e. during the pulse intervals, by a flow of current on the coil $R_1$ of relay R owing to the charge of capacitor $C_2$ brought about by the circuit: current from the exchange–terminal $L_1$–coil $R_1$–coil $I_2$–switch $r_1$ in position (2)–capacitor $C_2$–terminal $L_2$–return line to telephone exchange. This current does not flow when a line to the exchange is interrupted and thus the holding action of relay R is removed. The temporary holding action of the discriminator during the line interruptions is obtained by a delay action of relay I by means of the discharge current of capacitor $C_2$ upon the circuit: capacitor $C_2$–$r_1$ *in position* (2)–coil $I_2$–coil $I_1$–terminal $T_1$–telephone set–terminal $T_2$–capacitor $C_2$.

The control of the voltage value in the telephone line is realized by a suitable resistor $y$ and a switch $r_2$ of relay R series connected between them and connected across winding $I_1$ of relay I to permit, through resistor $y$, *the attraction of armature* $b_1$ of relay I and thus the starting of the disabler only when the line potential has reached a predetermined value; when relay R is energized, contact $r_2$ cuts off resistor $y$ from the circuit.

The present embodiment utilizes during the dialing of the first digit a sensitizing circuit formed by capacitor $C_2$ and winding $I_2$, interconnected in such a manner as to set up a magnetic flux in the same sense as that of winding $I_1$, in series with the line in the discharge stage of capacitor $C_2$ and in the opposite sense during its charging stage. Said circuit is inserted across the two line wires and placed in such a position that during dialing, in the opening stage of the line leading to the telephone set, the capacitor $C_2$ absorbs, from the exchange current, energy which contributes to keep relay R operating and causes, through winding $I_2$, the quick deenergizing of relay I, while during the closure of the telephone line the capacitor discharges the stored energy to the telephone set through through the windings $I_2$ and $I_1$ of relay I thereby increasing the sensitivity of said component. Said sensitizing circuit boosts the performance of the device, limits the distortion of the dial pulses caused by the components of said device and permits to adopt cores of common magnetic iron for relays R and I.

The circuit of FIG. 3 shows additionally a capacitor $C_1$ to practically remove the damping of the device at the speech frequencies, and two contacts $ch_1$ and $ch_2$ of a connector, which are switched by the subscriber to insert and disconnect at will the device from the telephone line.

Where the conditions permit, the device of FIG. 3 can be simplified by eliminating capacitor $C_2$ which produces the sensitizing and the control of the feed current.

In this case the feed current control can be obtained by varying the electromechanical characteristics of relays R and I in such a manner that relay R, in the absence of energy in the line (interruptions on the exchange side), becomes more quickly deenergized than relay I.

The circuit shown in FIG. 4 differs from that of FIG. 3 by the arrangement of $i_1$ and $i_2$ which perform, with the addition of capacitor $C_3$, the temporary holding of relays R and I at the end of the dialing of the first digit. Said arrangement, with suitable values of capacitor $C_3$ and windings $R_1$ and $I_1$, effects, during the dialing of the first digit, the temporary holding of relay R through $C_3$ and $i_1$ in position (1) and permits relay I to energize at each pulse thereby actuating the selector assembly; at the end of the first pulse train it produces the temporary holding of relays R and I and thereby the blocking of the selector assembly during the dialing of the successive digits through the circuit: $C_3$–$i_1$ in position (2)–$i_2$ in position 1-—10I1–R1–$C_3$ until the replacing of the handset which, by cutting off the current from windings $I_1$ and $R_1$ for a duration exceeding that of each pulse interval and thus that of the temporary holding action, brings about the deenergization of said relays, whereby the initial operating conditions of the device are restored. This circuit does not provide switch $r_1$ of relay R and therefore winding $I_2$ effects, with capacitor $C_2$ exclusively the functions of sensitizing the device and controlling the feed current. Components $I_2$ and $C_2$ can be omitted in particular cases thereby eliminating the sensitizing of the device and adopting in such cases, for the control of the feed current, the means already described for the circuit of FIG. 3.

Circuit 4 also shows, for a purely exemplicative purpose, the insertion of a signal detecting device comprising a sound relay S syntonized to the dial tone frequency and series connected to the line, a switch $s_1$ of relay S and a switch $r_2$ of relay R connected together in series and across the capacitor $C_1$. Said relay S permits the device to operate, only after the dial tone has been detected, by its own attraction and the opening of $s_1$; the attraction of relay R and thus the opening of contact $r_2$ prevent $s_1$ to be actuated successively.

Figure 5:
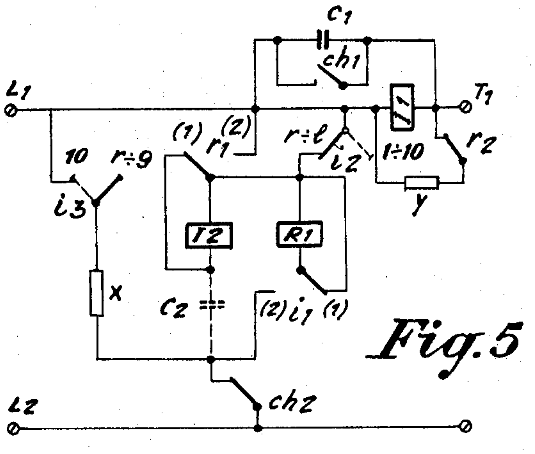

FIG. 5 shows another circuit whose operation is the following:

At the lifting of the handset, relay I is energized through winding $I_1$ and switch $i_1$ changes into position (2) while the selector assembly rotates one step to reach position *e*. At the first pulse of the first digit, the opening of the line on the side of terminals $T_1$ and $T_2$ brings about a flow of current in the circuit: telephone exchange–$L_1$–*i2–R1–I*$_1$ in position (2)–*ch2–L2*–elephone exchange which brings about the energization of relay R and thus the engagement of pawl *n* in ratchet wheel *rd;* consequently switch $r_1$ changes into position (2) thereby inserting the sensitizing circuit I2–$C_2$. The dial pulses actuate relay I, the selector assembly rotates clockwise at each pulse and at a first step it opens switch $i_2$; switch $i_1$ commutates at each pulse thereby short-circuiting winding $R_1$ in position (1) thereby bringing it into a temporary holding condition.

After the first digit has been dialed relay I keeps its armature attracted owing to its winding $I_1$ and relay R is deenergized owing to the closing of the line between terminals $T_1$ and $T_2$; relay I and thus the selector assembly is blocked owing to the short-circuiting of winding $I_2$ brought about by the shifting of $r_1$ into position (1) and remains blocked throughout the dialing of the successive digits until the handset is hung up again. The operation of the other components is identical to that already described in the circuit of FIG. 3; however, for the circuit of FIG. 5 there is no need of a feed control and therefore, where there is no necessity for sensitizing the circuit it is sufficient to eliminate capacitor $C_2$ from the circuit.

Figure 6:
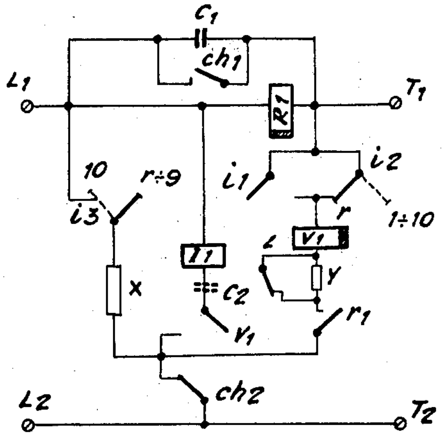

FIG. 6 shows another circuit where, among other things, the selector assembly has 11 positions in lieu of 12, since it contains no position *e;* its operation is the following:

The lifting of the handset and consequent closure of loop T1—$T_2$ determines a flow of current which keeps relay R and its holding winding $R_1$ energized during each pulse interval and thus the pawl *n* engaged in wheel *rd*. Switch $r_1$ is shifted by R into the closed position.

The dialing of the first digit, successively to the lifting of the handset, causes, as known, a pulse train, that is a train of interruptions and closings of line T1—$T_2$. During the first interruption, i.e. the first pulse interval, the current from the exchange will follow the following path: L1–R1–$i_2$ in the rest position (*r*)–relay V1–$r_1$ in the closed position–*ch2*–$L_2$. *During the first time fraction of said interruption, relay 1 is still inoperative since it is energized only by the discharge of a capacitor* $C_2$ *inserted between said relay and contact* $v_1$, which contact is controlled by the time relay $V_1$. The charge and discharge of capacitor $C_2$ depends on the closure of the circuit by contact of $v_1$, which, in this first time fraction is still in its open position. In the next time fraction, the time relay $V_1$ shifts contact $V_1$ into its closed position, so that $C_2$ is now charged. Both the capacitor $C_2$ and the winding of 1 are dimensioned, in a known manner, so that the operation of relay 1 is deferred to the end of the interruption time. When this end is reached, and the line T1—$T_2$ closes, capacitor $C_2$ will discharge into the loop: C2—I1—1—T1—T2—$ch_2$—*v1*—$C_2$; $I_1$ is energized, and shifts contact $i_1$ to the closed position, the contact $i_2$ to the position 1—10. During the successive pulses of said first pulse train, contact $i_2$ remains in position 1—10, while contact $i_1$ oscillates at each pulse, exactly as in the previous embodiments, between the open and closed position and consequently relay $V_1$, owing to its holding winding, remains energized throughout the duration of the first pulse train. At the completion of this pulse train, contact $i_1$ remains open, contact $i_2$ remains in position 1—10, relay $V_1$ is deenergized and opens contact $v_1$ relay 1 ceases responding to the successive digits and thus counting their pulses: the disabling device is thus rendered inoperative and dialed pulses can now reach the telephone exchange. When the handset is replaced, relay R is deenergized, consequently contact $r_1$ is open, and thereby ratchet wheel *rd* is freed, so that the spring *m* will restore the selector assembly to its initial position. The operation of the other components of this embodiment: *x*, $C_1$, $ch_2$ and cam disc $Cm_3$ with its relating contact $i_3$ are identical to those of the first embodiment, except that also in cam disc $Cm_3$ there is no position *e*.

In the embodiment of FIG. 6, the control of the line voltage value is realized by means of a resistor $y$ which can be short-circuited by a contact $v_2$ controlled by relay $V_1$, which permits the relay $V_1$ to be energized and attracted and thus the operation of the disabling device exclusively when the line voltage has reached a preestablished value.

Figure 7:
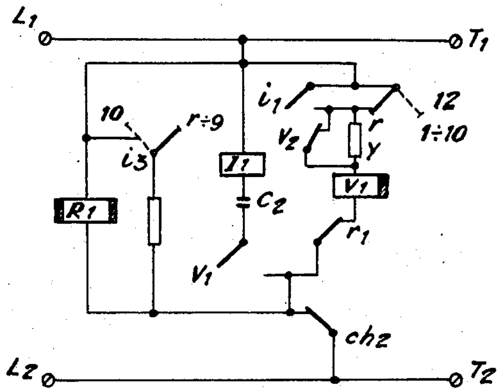

The embodiment of FIG. 7 is a variant of that of FIG. 6; in it the operating stages of relay R, together with the mechanical actuation of the pawl $n$ are inverted with respect to those of the corresponding relay R of FIG. 6 in consequence of the electrical connection of winding $R_1$ which is connected in parallel with the telephone line. This embodiment provides a relay R consisting of a winding $R_1$ inserted across the line wires (with an energizing delay equaling the duration of the pulse intervals, obtained by means per se known), a switch $R_1$ connected in series with the winding $V_1$, a mechanical connection with the pawl $n$ to permit the selector assembly to count the pulses when the relay is deenergized.

In the rest conditions of the telephone set, relay R is energized and, with the pawl $n$ disengaged and the switch $r_1$ opened, it keeps all the components of the device in an operative position. When the handset is lifted, relay R is deenergized owing to the closing of the telephone line between terminals $T1—T_2$ and it remains in this position through its own energizing delay until the replacement of the handset, which operation, which opens the line between $T1—T_2$ for a time longer than the delayed action of relay $R_1$ produces the energizing of relay R. Relay R disengages consequently pawl $n$, and restores the initial operating conditions of the device. The operating stages of the other components of the circuit of FIG. 7 are identical to those of the corresponding components of FIG. 6. This wiring eliminates the contact $ch_1$ and the capacitor $C_1$ and permits the disabling device to be inserted across the wires of the telephone line.

I claim:

1. An excluding device adapted to be connected to automatic telephone equipment and which, when so connected, permits normal operation of said equipment when the first digit dialed is a permitted digit, and which disables said equipment when the first digit dialed is an excluded digit, said device comprising:
   - a pulse counting unit having at least one selector cam disc mounted thereon:
   - a ratchet enabling relay coacting with said pulse counting unit;
   - a step-by-step relay to actuate said pulse counting unit;
   - a first holding coil mounted on said ratchet enabling relay and arranged by means of its circuit to retain said ratchet enabling relay in an actuated condition until completion of the first dial pulse train;
   - a second holding coil mounted on said step-by-step relay and adapted to block said step-by-step relay at the completion of the first pulse train; and pulse damping means operatively associated with said cam disc and arranged to be inserted by said cam disc into the subscriber line connected to said telephone equipment when the first dial pulse train corresponds to an excluding digit, thereby disabling said telephone equipment during the remainder of the call.

2. An excluding device according to claim 1, additionally comprising a switch arranged to connect and disconnect the device from the line between said telephone equipment and the telephone exchange, and a capacitor adapted to be inserted between a telephone line and said second holding coil to prevent said pulse counting unit from being actuated by current interruptions occurring in said lines not resulting from dial pulses.

3. An excluding device according to claim 1, wherein a capacitor is provided which is series connected with said second holding coil of the step-by-step relay and across the subscriber line.

4. An excluding device according to claim 1, wherein the armature of said step-by-step relay is provided with switch contact means adapted to control thereby the holding action of said first holding coil during the intervals of the first dial pulse train.

5. An excluding device according to claim 1, additionally comprising means permitting the operation of said device only upon actuation by the signal of a dial tone applied thereto.

6. An excluding device according to claim 1, wherein said ratchet enabling relay is provided with an armature and a pawl, and said pulse counting device is provided with a ratchet wheel, whereby in its attracted position said ratchet enabling relay lifts said pawl into engagement with said ratchet wheel, and having a switch actuated by said ratchet enabling relay simultaneously freeing the step-by-step relay.

7. An excluding device according to claim 1, wherein said pulse counting unit comprises a shaft rotatably mounted and having a return spring biasing said shaft toward its starting position, a ratchet wheel affixed to said shaft, first and second selector cam discs mounted on said shaft, said step-by-step relay being arranged to actuate by means of said first selector cam disc switch contact means arranged to produce at the end of the first dial pulse train the blocking of said step-by-step relay at the completion of the first digit when the first dial pulse train corresponds to a permissible digit, and whereby when the first dial pulse train corresponds to an excluding digit, said second selector cam disc actuates a contact switch provided therewith thereby inserting a damping resistor across said telephone line.

8. An excluding device according to claim 1, additionally comprising a capacitor and associated first switching means, and a second switching means adapted to be actuated by said selector cam disc and kept closed throughout a pulse train, whereby at any pulse interval of the first dial pulse train said capacitor is connected by said first switching means in parallel with the winding of said ratchet enabling relay which is actuated by the step-by-step relay, and whereby at each pulse said capacitor is connected in parallel to the windings of said ratchet enabling relay and of said step-by-step relay by said first switching means together with said second switching means.

9. An excluding device according to claim 1, wherein a first selector cam disc and coacting contact switch means are provided and so arranged that said first selector cam disc opens said contact switch means in the rest position and in the operation-initiating position and closes said switch contact means in the position assumed during the first dialed digit, said step-by-step relay being provided with an associated switch, whereby said ratchet enabling relay is actuated at each pulse of the first pulse train to maintain said relay energized throughout the duration of said first pulse train and thereby cause said relay to insert by means of said associated switch said second holding coil, and a capacitor connected in series with said latter coil across said telephone line.

10. An excluding device according to claim 1, wherein a contact switch means and a dial pulse damping means are provided, said damping means being connected across said telephone lines by said contact switch means upon actuation by a selector disc of said pulse counting unit.

11. An excluding device according to claim 1, additionally comprising a capacitor adapted to pass speech frequencies connected in said line in parallel with said excluding device, thereby reducing to a minimum the damping of said speech frequencies.

12. An excluding device according to claim 1, additionally comprising a resistor and a switch adapted to connect said resistor in parallel with the winding of said step-by-step relay.

13. An excluding device according to claim 1, additionally comprising a resistor connected in parallel across the winding of said step-by-step relay and adapted to control the line voltage, whereby said relay is permitted to operate only when a preselected line voltage is attained.

14. An excluding device according to claim 1, additionally comprising a tuned relay being tuned to be actuated only by dial tone frequencies.

UNITED STATES PATENT OFFICE
CERTIFICATE OF CORRECTION

Patent No. 3,566,042 Dated 23 February 1971

Inventor(s) Giorgio Pugliese

It is certified that error appears in the above-identified pat and that said Letters Patent are hereby corrected as shown below:

| | |
|---|---|
| Col. 2, line 34<br>Appl. Amendment dated<br>7/2/70 - Page 2, line 5: | "render," should read --- render --- |
| Col. 2, line 71<br>Appl. Amendment dated<br>9/19/69, Page 2, line 31: | "organs will now be" should read --- organs shown in Fig. 2 w now be --- |
| Col. 4, line 37<br>Appl. Page 11, line 13: | "(10in the figures) should read --- (10 in the figures) --- |
| Col. 5, line 53<br>Appl. Page 14, line 14: | "-10I1-R1-$C_3$" should read --- -10 - $I_1$ - $R_1$ - $C_3$ --- |
| Col. 6, line 6<br>Appl. Page 15, line 13: | "$L_1$-i2-R1-$I_1$" should read --- - $L_1$ - $i_2$ - $R_1$ - $i_1$ --- |
| Col. 6, line 7-8<br>Appl. Page 15, line 14: | "(2)-ch2-L2-elephone" should read --- (2)-$ch_2$ - $L_2$ - telephone |

UNITED STATES PATENT OFFICE

CERTIFICATE OF CORRECTION

Patent No. 3,566,042 Dated 23 February 1971

Inventor(s) Giorgio Pugliese

It is certified that error appears in the above-identified pate[nt] and that said Letters Patent are hereby corrected as shown below:

Col. 6, line 10
Appl. Page 15, line 17: "I2" should read --- $I_2$ ---

Col. 6, line 32
Appl. Page 16, line 9: "T1" should read --- $T_1$ ---

Col. 6, line 38
Appl. Page 16, line 17: "T1-$T_2$" should read --- $T_1 - T_2$ ---

Col. 6, line 40
Appl. Page 16, line 19 "Li-R1-$i_2$" should read --- $L_1 - R_1 - i_2$ ----

Col. 6, line 41
Appl. Page 16, lines 20-21 "V1-$r_1$ in the closed positio[n] ch2-$L_2$." should read --- $V_1 - r_1$ in the closed p[osition] -$ch_2 - L_2$. ---

Col. 6, line 49
Appl. Page 16, line 29 "$V_1$ into its" should read --- $v_1$ into its ---

UNITED STATES PATENT OFFICE
CERTIFICATE OF CORRECTION

Patent No. 3,566,042 Dated 23 February 1971

Inventor(s) Giorgio Pugliese

It is certified that error appears in the above-identified pate and that said Letters Patent are hereby corrected as shown below:

Col. 6, line 53
Appl. Page 17, line 2: "T1-$T_2$" should read --- $T_1$ - $T_2$ ---

Col. 6, Line 54
Appl. Page 17, line 3: "C2-I1-1-T1-T2-$ch_2$-v1-$C_2$" should read --- $C_2$ - $I_1$ - $R_1$ - $T_1$ - $T_2$ $v_1$ - $C_2$ ---

Col. 6, line 72
Appl. Page 17, line 23: "x,$C_1$,$ch_2$" should read --- x, $C_1$, $ch_1$, $ch_2$ ---

Col. 7, line 25
Appl. Page 18, line 20: "T1-$T_2$" should read --- $T_1$ - $T_2$ ---

Col. 7, line 27
Appl Page 18, line 23: "T1-$T_2$" should read --- $T_1$ - $T_2$ ---

Col. 7, Claim 1, line 44
Appl. Amend. 4/8/70, page 2, line 7 of Claim 27(Amended): "thereon:" should read --- thereon; ---

UNITED STATES PATENT OFFICE

CERTIFICATE OF CORRECTION

Patent No. 3,566,042 Dated 23 February 1971

Inventor(s) Giorgio Pugliese

It is certified that error appears in the above-identified pa
and that said Letters Patent are hereby corrected as shown below:

| | |
|---|---|
| Col. 8, Claim 7, line 20 Appl. Amend 9/19/69, page 5, line 6 of amended Claim 33: | "cam disc switch" should read --- cam disc, switch --- |

Signed and sealed this 28th day of December 1971

(SEAL)
Attest:

EDWARD M.FLETCHER,JR.
Attesting Officer

ROBERT GOTTSCHALK
Acting Commissioner of